United States Patent [19]

Pesotini

[11] Patent Number: 5,368,731
[45] Date of Patent: Nov. 29, 1994

[54] VACUUM ASSISTED SLAKER CLASSIFIER

[75] Inventor: Jeffrey C. Pesotini, Milford, Conn.

[73] Assignee: Dorr-Oliver Incorporated, Milford, Conn.

[21] Appl. No.: 131,322

[22] Filed: Oct. 4, 1993

[51] Int. Cl.$^5$ .................. B01D 29/92; B01D 35/027; C04B 2/08; C01F 11/02
[52] U.S. Cl. .................... 210/295; 210/298; 210/312; 210/319; 210/406; 210/408; 210/409; 210/523; 210/526; 210/527; 210/928; 162/240; 209/173; 209/464; 209/492; 422/162; 422/185; 423/640; 423/DIG. 3
[58] Field of Search ............ 209/173, 464, 492; 210/298, 312, 319, 406, 408, 409, 415, 205, 208, 523, 525, 526, 527, 295, 928; 422/162, 185; 423/640, DIG. 3; 162/240; 134/104.4

[56] References Cited

U.S. PATENT DOCUMENTS

| | | |
|---|---|---|
| 1,098,812 | 6/1914 | Lowden . |
| 1,156,543 | 10/1915 | Nevill . |
| 1,330,242 | 2/1920 | Donald . |
| 1,726,404 | 8/1929 | McConville . |
| 1,870,409 | 8/1932 | Finney . |
| 2,191,743 | 2/1940 | Scott ................. 198/224 |
| 2,261,390 | 11/1941 | Kite . |
| 2,559,403 | 7/1951 | Cover . |
| 2,560,016 | 7/1951 | Walker . |
| 2,705,562 | 4/1955 | Albertson . |
| 3,028,962 | 4/1962 | Davis . |
| 3,170,770 | 2/1965 | Bousman . |
| 3,194,638 | 7/1965 | Neuville . |
| 3,258,391 | 6/1966 | Cornell . |
| 3,865,727 | 2/1975 | Broling . |
| 4,261,953 | 4/1981 | Gisler . |
| 4,366,142 | 12/1982 | Kojima . |
| 4,389,376 | 6/1983 | Kojima . |
| 4,401,645 | 8/1983 | Gisler . |
| 4,436,703 | 3/1984 | Lane . |
| 4,482,528 | 11/1984 | Emmett . |
| 4,547,349 | 10/1985 | Lane . |
| 4,627,888 | 12/1986 | Engdahl . |
| 4,762,590 | 8/1988 | Engdahl . |
| 4,853,115 | 8/1989 | Kennel ................. 209/173 |
| 4,871,449 | 10/1989 | Lott . |
| 4,941,945 | 7/1990 | Pettersson . |

FOREIGN PATENT DOCUMENTS 1013431  4/1983  U.S.S.R. .

OTHER PUBLICATIONS

Dorr-Oliver Bulletin SLK-2, "The Dorr-Oliver Slaker", Published by Dorr-Oliver Incorporated.

Primary Examiner—Thomas M. Lithgow
Attorney, Agent, or Firm—DeLio & Peterson

[57]  ABSTRACT

The grit conveyance system of a classifier having a wash region above the liquid layer is provided with a vacuum means in the wash region for positive removal of liquids through a metal screen for disposal.

5 Claims, 2 Drawing Sheets

VACUUM ASSISTED SLAKER CLASSIFIER

BACKGROUND OF THE INVENTION

1. Field of the Invention

This invention is directed to a classifier having a wash region for cleaning particulate solids prior to further processing or disposal and may be associated with a slaking unit in a slaking machine.

The classifier was developed early in the century for minerals classification, but it has since been successfully employed to produce a consistently high grade of milk of lime for use in neutralizing acid waste streams, in flue gas desulfurization in the power industry, and for preparation of flotation slurries in mineral processing. These prior art machines consist of a rectangular tank having an inclined deck or ramp, a conveyor structure within the rectangular tank which runs parallel to and is positioned close to the inclined deck of the tank for moving settled particulate material or grit along the inclined deck to a point above the liquid or slurry level in the tank. The classifier may include a wash mechanism for washing the grit near the upper end of the inclined deck.

The feed material or slurry to be treated is fed into the lower end of the tank. The liquid in the tank only partially fills it, with the deepest part of the liquid at the lower end of the tank. An outlet is provided for clarified liquor through the end or sidewall of the tank to remove the liquor and control the liquid level in the tank. In operation, then, the lower portion of the inclined conveyor mechanism is below the liquid level in the tank, while the upper portion of the conveyor mechanism and inclined deck are above the liquid in the tank.

The conveyor system transports grit up the inclined deck of the tank, usually through a wash zone above the liquid level of the tank in a so-called "beach" portion of the deck or ramp surface. Grit particles are drained of associated liquid and of wash liquid in this "beach" portion before being discharged from the tank at its upper end. The drained liquid flows back down the ramp into the liquid in the tank.

In the Kraft or sulfate process of the pulp and paper industry, the pulp is prepared by digesting wood chips in a strongly alkaline liquor containing primarily, NaOH. The NaOH content of the liquor is consumed in pulping and the spent liquor, called black liquor, is combustible and contains lignin and residual chemicals. The black liquor is concentrated and then burned for its energy in a boiler, leaving a melt of combustion products consisting primarily of $Na_2CO_3$. The melt is dissolved in water to form green liquor, which is reacted with lime in a slaker machine to produce $Ca(OH)_2$ which then reacts with the $Na_2CO_3$ of the green liquor in the slaker machine to form NaOH. The NaOH can then be used in the digestion step described above.

The slaker apparatus or machine is a compact dual compartment machine. It consists of a slaking unit and a classifier compartment. The slaker unit is comprised of a steel cylindrical tank and an impeller type mixer supported by tank spanning beams and is designed to promote rapid intimate contact between lime and water additions. The rectangular tank classifier compartment is connected to the slaking unit by submerged slurry passage ports. It includes of a heavy duty conveyor means for lifting the grit along the ramp to the beach section above the liquid level in the classifier compartment, where the grit is washed, and then to a washed grit discharge conduit.

A slaker machine is one in which lime reacts with hot water in the slaking reaction as follows:

$$CaO + H_2O \rightarrow Ca(OH)_2$$

In the slaking unit, lime and slaking liquid (water and weak liquor) are fed into the unit through inlets provided in the cover. Generally, a 3:1 liquid to lime ratio is used. The partially slaked slurry passes into the classifier where slaking continues for a time and the grit settles on the conveyor mechanism. The conveyor mechanism transports the grit up the ramp for a final water spray or wash and then to discharge for disposal. The degritted milk of lime from the clarified surface liquid layer in the classification compartment overflows into a launder which spans the classifier, and from the launder it is removed for utilization.

Of course, certain non-reactive materials including overburnt lime are introduced with the lime, and provision must be made for handling and disposing of these non-reactive materials as grit solids. Disposal of the grit solids has posed an environmental problem because the liquor associated with the grit is primarily the highly caustic product of the process; $Ca(OH)_2$. The pH of the grit-associated liquor has been measured at 13.2 to 13.5. A recent environmental standard has been established whereby solids disposed in landfills may not exceed a pH of 12.5. Spray washing of the grit material has not been found to be capable of reducing the pH to the extent necessary to respond to the new environmental requirement.

2. Description of Related Art

U.S. Pat. No. 4,853,115, issued Aug. 1, 1989 provides a general description of a classifier device of the reciprocating rake type.

SUMMARY OF THE INVENTION

In accordance with the invention, a classifier has a wash portion in the beach region of the inclined deck or ramp wherein an overhead water spray arrangement washes the grit as it is transported by the conveyor mechanism up the ramp. A metal screen replaces a portion of the beach surface below the wash apparatus and a vacuum box is provided below the screen. Much of the high pH liquor associated with the grit is diluted and carried away by the wash liquid and passes with the wash liquid through the metal screen into the vacuum box and from there to disposal.

BRIEF DESCRIPTION OF THE DRAWINGS

For a fuller understanding of the invention, reference should be made to the following description taken in connection with the accompanying drawings in which.

DETAILED DESCRIPTION

Figure 1:
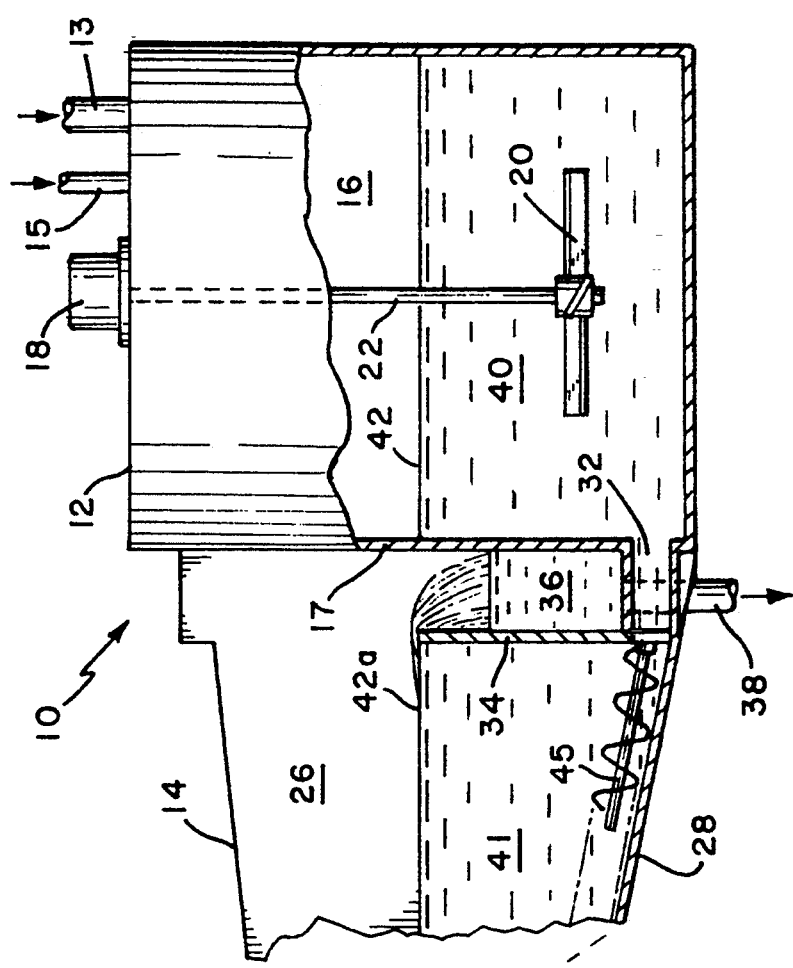
FIG. 1 is a side elevational view of the slaker machine including the slaking unit and classifier compartment utilizing a screw-type conveyor mechanism with the vacuum box located in operative position.

Referring to FIG. 1, there is illustrated a slaker machine 10 comprised of a slaker unit 12 and a classifier compartment 14. The slaker unit includes a cylindrical tank 16 and a motor 18 for driving an impeller member 20 through shaft 22. A lime inlet conduit 13 is provided in the top of tank 16 as is a liquid inlet conduit 17. The classifier compartment 14 abuts the slaker unit 12 and includes a rectangular tank 26 which has an inclined deck 28. One or more ports 32 are provided interconnecting tank 16 with tank 26. Within tank 26 at the lower end thereof, a dam 34 is positioned essentially parallel to the wall 17 of tank 16 and defines one side of a launder 36 which extends to the tank wall 17. As shown in FIG. 1, a slurry 40 partially fills tank 16 with the liquid level thereof indicated at 42 and the slurry 41 partially fills tank 26 with the liquid level therein indicated at 42a, the levels in the two tanks being essentially equal.

A grit conveyor 45 is provided in the rectangular tank 26 located adjacent the inclined deck or ramp 28 and running parallel to that inclined deck from the lower end thereof upward to the ramp end adjacent the end wall 52 of tank 26. At the upper end of the ramp 28, a grit discharge conduit 50 is provided.

The grit conveyor 45 thus extends from the lowest point of the rectangular tank 26 along the inclined deck or ramp 28 to a point at which it emerges from the slurry in the tank and extends substantially above the liquid level 42 in tank 26. The region along the ramp 28 above liquid level 42a is termed a "beach" area, and in that beach area 70, a portion of the liquid associated with the grit may drain back into the slurry 41 in tank 26. A portion of the beach surface is replaced by a metal screen 71, preferably a stainless steel screen, in a wash area of the beach 70. In this area, a wash inlet conduit 55 supplies a plurality of wash nozzles 57 positioned to direct a spray shower upon the grit as it is moved through the wash area over screen 71 by the grit conveyor 45.

Figure 2:
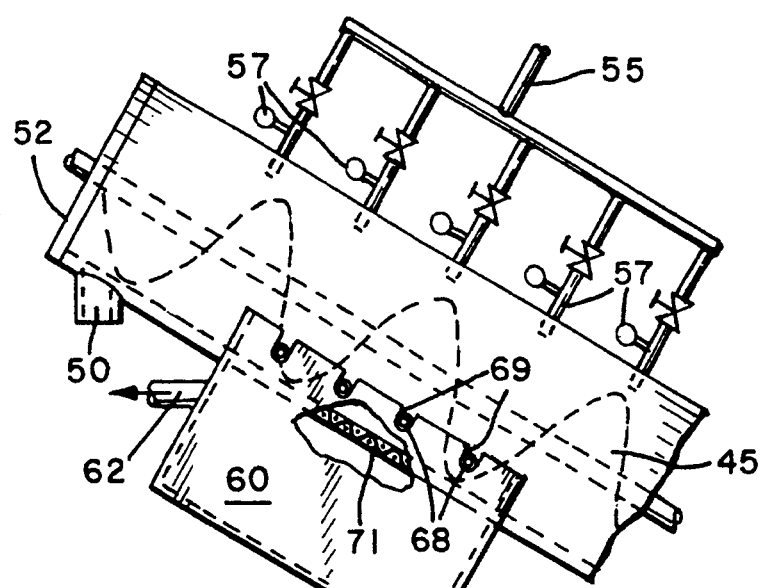
FIG. 2 is an enlarged side elevational view of the shower and vacuum box section of the classifier compartment.
Figure 3:
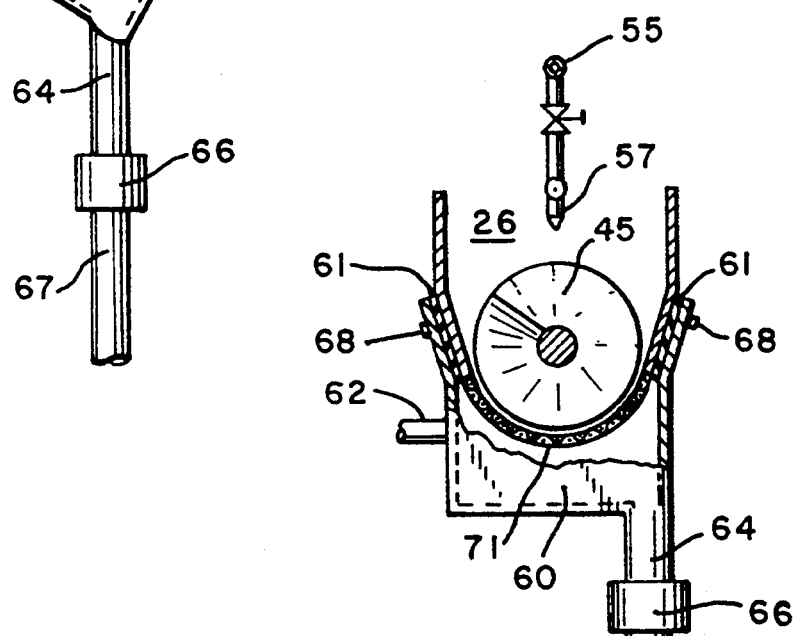
FIG. 3 is a sectional view of the vacuum box in the beach portion of the classifier ramp taken along line 3—3 of FIG. 1.

A vacuum box 60 in the region of the metal screen 71 provides a sealed compartment below the metal screen 71. As seen in FIGS. 2 and 3, the vacuum box 60 may be secured to the rectangular tank 26 by wing nuts 68 which extend through scalloped cutouts 69 in the vacuum box 60. A seal member 61 is interposed between the wall of vacuum box 60 and the wall of tank 26 to prevent air leak into the vacuum box. A conduit 62 passes through the wall of vacuum box 60 and is attached to a source of vacuum (not shown). The lower surface of vacuum box 60 is inclined in a sense parallel to the inclined deck or ramp 28 of the rectangular tank 26, and at the lower point thereof, there is provided a liquid discharge conduit 64 for discharging wash runoff. The discharge conduit 64 is connected to the outlet conduit 67 through a rubber grommet 66 which facilitates ready attachment and disengagement.

The launder 36 which lies between the dam 34 and the wall 17 of tank 16 is connected to a product discharge conduit 38.

In operation, lime (CaO) and water (60°–80° C.) are introduced through inlets 13 and 17, respectively, and the materials introduced are well mixed by operation of the impeller 20 to form milk of lime (Ca(OH)$_2$); the slaking reaction. Slaking is well started in the slaker unit 12, but continues in the slurry body 41 in the classifier compartment 14. Grit, which is largely overburnt lime and may include other non-reactive material, settles on the ramp 28 of the classifier compartment 14 and is transported up the ramp 28 by the grit conveyor 45. The grit is eventually moved into the beach region 70 of the ramp where some of the caustic liquid associated with the grit drains back into the slurry body 40a. The grit conveyor continues to move the grit across the metal screen 71 beneath the spray washing nozzles 57 where the grit is flooded with wash liquid. Vacuum in vacuum box 60 draws the wash liquid and caustic associated with the grit through screen 71 into box 60 from which it is discharged through conduit 64 for disposal or recycling into the process. The washed grit, now at a reduced pH level, is conveyed along ramp 28 to grit discharge conduit 50 for removal from the classifier and disposal in a landfill.

The product milk of lime in slurry body 41 overflows dam 34 into launder 36 and is from there removed through product discharge conduit 38 for use.

In the Kraft or pulp process, green liquor is also added to the slaking machine and the Ca(OH)$_2$ formed reacts with the Na$_2$(CO$_3$) of the green liquor as follows:

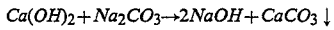
$$Ca(OH)_2 + Na_2CO_3 \rightarrow 2NaOH + CaCO_3 \downarrow$$

The NaOH can then be recycled to the digestion step.

Figure 4:
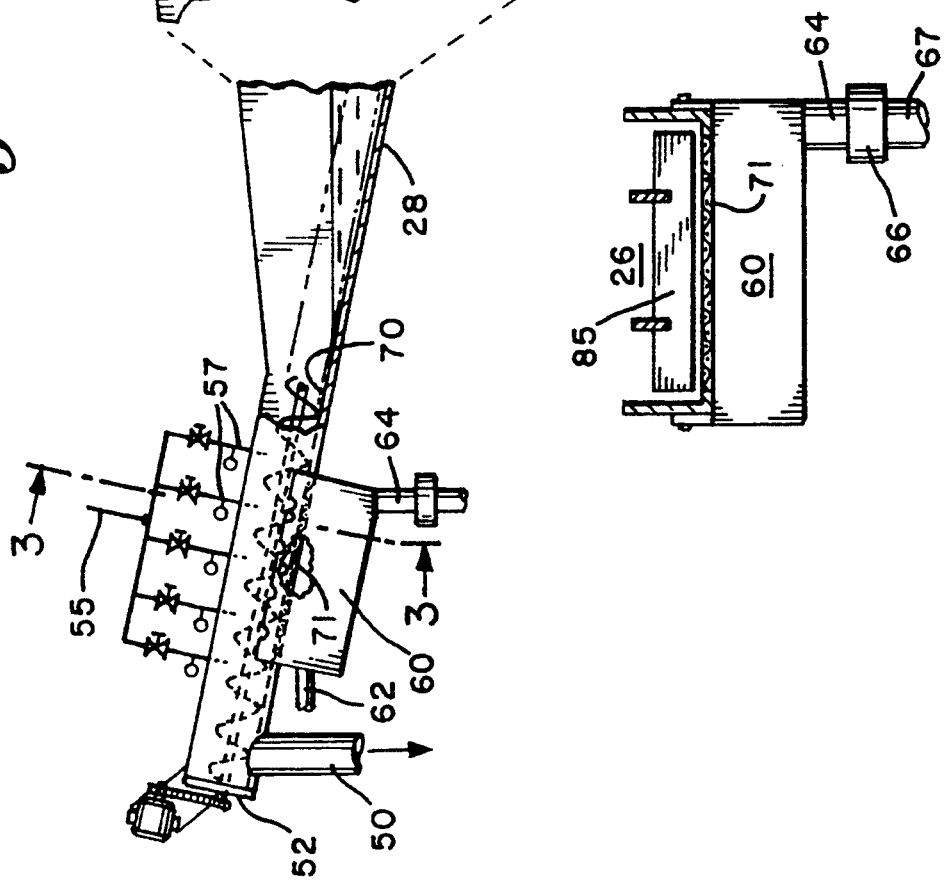
FIG. 4 is a sectional view similar to FIG. 3 showing an alternative embodiment in which the beach surface of the classifier ramp is planar and provided with a reciprocating rake device.

As an alternative to the screw-type conveyor mechanism disclosed in the above description, FIG. 4 shows an embodiment in which a reciprocating rake device is utilized. The same reference numerals are employed in FIG. 4 to identify structural elements which appear in FIGS. 1–3. Rake element 85 in FIG. 4 is a slat-like planar member. The reciprocating rake mechanism is provided with a plurality of the members 85 as shown in U.S. Pat. No. 4,853,115.

The wash and vacuum arrangement of this invention can achieve a reduction in pH value of the disposed grit to 12.5 and below.

While the invention has been described with particular reference to use in a slaker machine, it will be understood by those skilled in the art that the invention may be applied to any classifier where there is a requirement for very thorough washing of particulate solids moving through a wash region on the inclined deck of the classifier. Modifications and variations in the apparatus and process may be resorted to without departing from the spirit and scope of the invention. Such modifications and variations are considered to be within the purview and scope of the invention and appended claims.

Thus, having described the invention, what is claimed is:

1. A slaker apparatus employed in the Kraft or pulp process having a slaking unit and a classifier compartment for producing a caustic solution having a pH over 12.5, the slaker unit comprising a tank and impeller type mixer having means for introducing lime, water and green liquor, the reaction of these constituents establishing a caustic solution of NaOH to a desired liquid level in said tank, the classifier compartment being connected to the slaker by submerged slurry passage ports to achieve a common liquid level with the caustic solution in said tank and having an inclined deck or ramp which extends from a bottom location in said compartment to a beach region above the liquid level in said compartment, a grit conveyor means extending along said ramp to convey settled particulate solids associated with caustic solution having a pH over 12.5 up said ramp to said beach region, a screen provided in the surface of said beach region of said ramp, wash means positioned above said screen to direct a spray of wash liquid upon the particulate solids as they are conveyed across said screen, said spray of wash liquid directed upon said particulate solids to displace caustic solution associated therewith, a vacuum means below said screen for drawing wash liquid through said settled particulate solids and said screen, and conduit means at the upper end of said beach region for receiving washed particulate solids associated with residual liquid having a pH less than 12.5 for disposal.

2. The slaker apparatus of claim 1 wherein said vacuum means is an enclosure or box sealed to said ramp and having connection to a source of vacuum.

3. The slaker apparatus of claim 2 wherein said vacuum box is provided with a conduit for removal of wash liquid for disposal.

4. The slaker apparatus of claim 3 wherein said grit conveyor is a screw-type mechanism.

5. The slaker apparatus of claim 3 wherein said grit conveyor is a reciprocating rake mechanism.

* * * * *